(12) United States Patent
Takeuchi

(10) Patent No.: US 10,594,691 B2
(45) Date of Patent: Mar. 17, 2020

(54) INFORMATION PROCESSING APPARATUS, INFORMATION PROCESSING METHOD, AND PROGRAM

(71) Applicant: SONY CORPORATION, Tokyo (JP)

(72) Inventor: Yasuo Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 160 days.

(21) Appl. No.: 15/118,983

(22) PCT Filed: Jan. 22, 2015

(86) PCT No.: PCT/JP2015/051724
§ 371 (c)(1),
(2) Date: Aug. 15, 2016

(87) PCT Pub. No.: WO2015/146258
PCT Pub. Date: Oct. 1, 2015

(65) Prior Publication Data
US 2017/0054715 A1    Feb. 23, 2017

(30) Foreign Application Priority Data

Mar. 28, 2014 (JP) ................................ 2014-069436

(51) Int. Cl.
*H04L 29/06* (2006.01)
*H04W 12/06* (2009.01)
(Continued)

(52) U.S. Cl.
CPC .......... *H04L 63/0869* (2013.01); *G06F 21/44* (2013.01); *H04L 9/0861* (2013.01);
(Continued)

(58) Field of Classification Search
CPC ....... H04L 63/869; H04L 9/861; H04L 63/61; G06F 21/44
(Continued)

(56) References Cited

U.S. PATENT DOCUMENTS 6,535,607 B1 *   3/2003  Chandersekaran ... H04L 9/0841
                                                     380/277
2002/0186846 A1 * 12/2002  Nyberg ................. H04L 9/0841
                                                     380/273
(Continued)

FOREIGN PATENT DOCUMENTS

CN          1716218 A      1/2006
JP       2005-122365       5/2005
(Continued)

OTHER PUBLICATIONS

Chen, "Embedding the MRC and SC Schemes into Trust Management Algorithm Applied to IoT Security Protection", 2018, Springer, pp. 461-477 (Year: 2018).*

(Continued)

*Primary Examiner* — Alexander Lagor
*Assistant Examiner* — Gregory A Lane
(74) *Attorney, Agent, or Firm* — Paratus Law Group, PLLC

(57) ABSTRACT

Provided is an information processing apparatus including: a processing unit configured to selectively perform a process using information acquired from an application. The processing unit generates second key information based on first key information when the first key information is acquired from an application, retains specific information for specifying a target application on which a process is to be performed, when the first key information is acquired, determines whether an accessing application is the target application based on the specific information when being accessed by the application after the specific information is retained, performs a process based on information acquired from the accessing application and the second key information when the application is determined to be the target application, and refrains from performing a process using (Continued)

information acquired from the accessing application when the application is determined not to be the target application.

10 Claims, 6 Drawing Sheets

(51) Int. Cl.
 *G06F 21/44* (2013.01)
 *H04L 9/08* (2006.01)
 *H04W 12/04* (2009.01)
 *H04W 4/60* (2018.01)

(52) U.S. Cl.
 CPC .......... *H04L 63/061* (2013.01); *H04W 12/04* (2013.01); *H04W 12/06* (2013.01); *H04W 4/60* (2018.02)

(58) Field of Classification Search
 USPC ........................................................ 713/169
 See application file for complete search history.

(56) References Cited

U.S. PATENT DOCUMENTS

| | | | | |
|---|---|---|---|---|
| 2005/0198529 | A1* | 9/2005 | Kitani | G11B 20/00188 726/22 |
| 2009/0262926 | A1 | 10/2009 | Kabra et al. | |
| 2011/0067097 | A1* | 3/2011 | Park | G06F 21/54 726/19 |
| 2011/0131421 | A1 | 6/2011 | Jogand-Coulomb et al. | |
| 2012/0144202 | A1 | 6/2012 | Counterman | |
| 2012/0204255 | A1* | 8/2012 | Park | G06F 21/44 726/18 |

FOREIGN PATENT DOCUMENTS

| | | |
|---|---|---|
| JP | 2013-094249 | 5/2013 |
| JP | 2013-196291 | 9/2013 |
| WO | WO 2009/004411 A1 | 1/2009 |

OTHER PUBLICATIONS

Aug. 31, 2017, EP communication issued for related EP application No. 15768024.0.

Wikipedia, "Transport Layer Security", https://en.wikipedia.org/wiki/Transport_Layer_Security, Retrieved on Aug. 16, 2017, pp. 17-19.

Sep. 21, 2018, Chinese Office Action issued for related CN Application No. 201580015277.4.

Oct. 2, 2018, Japanese Office Action issued for related JP Application No. 2016-510082.

* cited by examiner

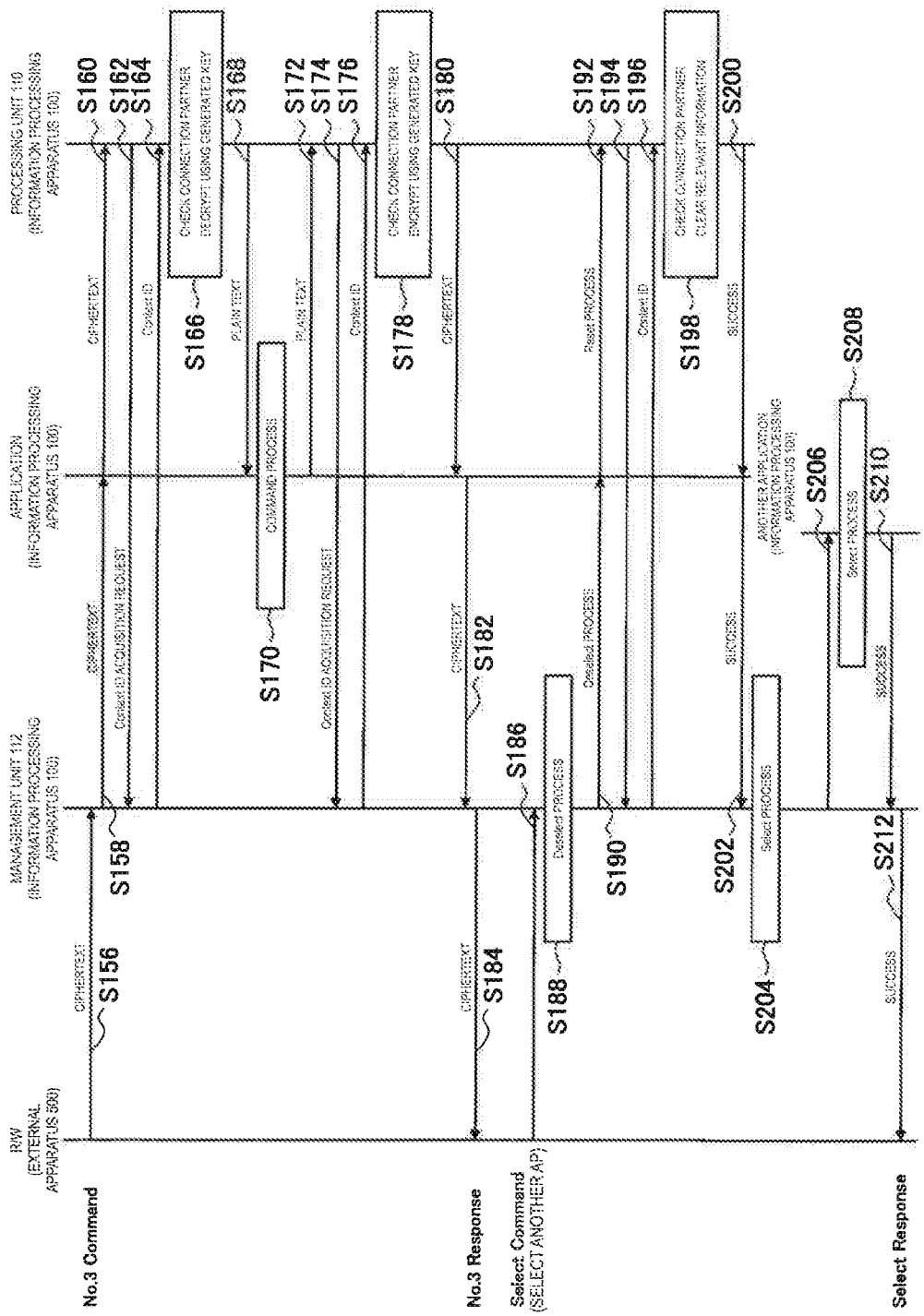

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2015/051724 (filed on Jan. 22, 2015) under 35 U.S.C. § 371, which claims priority to Japanese Patent Application No. 2014-069436 (filed on Mar. 28, 2014), which are all hereby incorporated by reference in their entirety.

TECHNICAL FIELD

The present disclosure relates to an information processing apparatus, an information processing method, and a program.

BACKGROUND ART

Technologies in which a target on which a process is to be performed is specified through mutual authentication and then encrypted communication is performed have been developed. As a technology in which a communication key is generated on a condition that mutual authentication succeeds and encrypted communication is performed using the generated communication key, for example, the technology disclosed in Patent Literature 1 described below is exemplified.

CITATION LIST

Patent Literature

Patent Literature 1: JP 2013-94249A

SUMMARY OF INVENTION

Technical Problem

When mutual authentication is performed as in the technology disclosed in Patent Literature 1, for example, there is a possibility of secure communication being realized, but it is necessary for respective targets of authentication to have key information (data) for mutual authentication.

The present disclosure proposes a novel and improved information processing apparatus, information processing method, and program that enable a process to be performed using information acquired from a specific application.

Solution to Problem

According to the present disclosure, there is provided an information processing apparatus including: a processing unit configured to selectively perform a process using information acquired from an application. The processing unit generates second key information based on first key information when the first key information is acquired from an application, retains specific information for specifying a target application on which a process is to be performed, when the first key information is acquired, determines whether an accessing application is the target application based on the specific information when being accessed by the application after the specific information is retained, performs a process based on information acquired from the accessing application and the second key information when the application is determined to be the target application, and refrains from performing a process using information acquired from the accessing application when the application is determined not to be the target application.

According to the present disclosure, there is provided an information processing method executed by an information processing apparatus, including: a step of selectively performing a process using information acquired from an application. In the step of performing the process, when first key information is acquired from an application, second key information is generated based on the first key information, when the first key information is acquired, specific information for specifying a target application on which a process is to be performed is retained, when there is access from an application after the specific information is retained, whether the accessing application is the target application is determined based on the specific information, when the application is determined to be the target application, a process is performed based on information acquired from the accessing application and the second key information, and when the application is determined not to be the target application, a process using information acquired from the accessing application is not performed.

According to the present disclosure, there is provided a program causing a computer to execute a step of selectively performing a process using information acquired from an application. In the step of performing the process, when first key information is acquired from an application, second key information is generated based on the first key information, when the first key information is acquired, specific information for specifying a target application on which a process is to be performed is retained, when there is access from an application after the specific information is retained, whether the accessing application is the target application is determined based on the specific information, when the application is determined to be the target application, a process is performed based on information acquired from the accessing application and the second key information, and when the application is determined not to be the target application, a process using information acquired from the accessing application is not performed.

Advantageous Effects of Invention

According to the present disclosure, it is possible to perform a process using information acquired from a specific application.

In addition, the effects described in the present specification are merely illustrative and demonstrative, and not limitative. In other words, the technology according to the present disclosure can exhibit other effects that are evident to those skilled in the art along with or instead of the effects based on the present specification.

BRIEF DESCRIPTION OF DRAWINGS

FIG. 6B is an explanatory diagram for describing an example of a process performed in the information processing apparatus according to the present embodiment.

DESCRIPTION OF EMBODIMENT(S)

Figure 1:
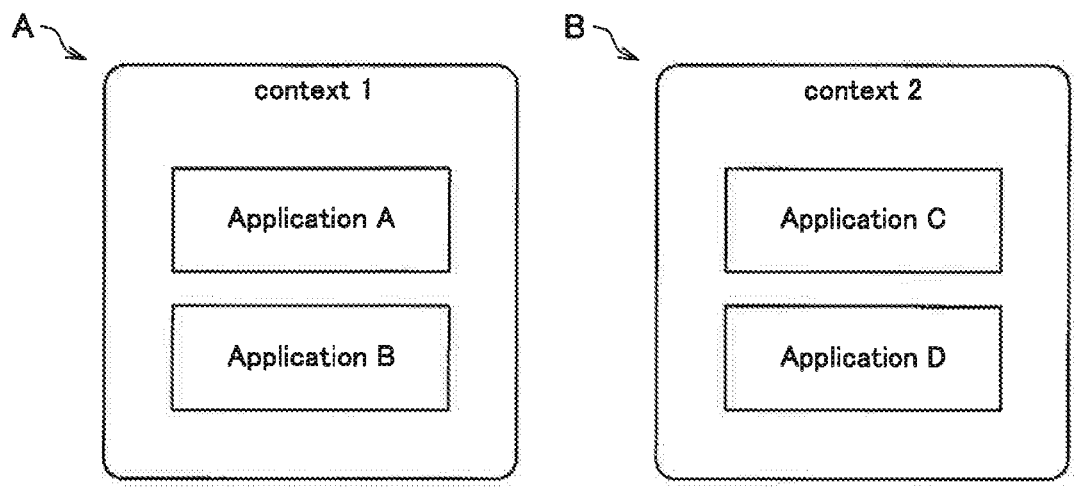
FIG. 1 is an explanatory diagram for describing Context ID.

Hereinafter, preferred embodiments of the present disclosure will be described in detail with reference to the appended drawings. In this specification and the drawings, elements that have substantially the same function and structure are denoted with the same reference signs, and repeated explanation is omitted.

Hereinafter, the description will be provided in the following order.

1. Information processing method according to embodiment
2. Information processing apparatus according to embodiment
3. Program according to embodiment

Information Processing Method According to Embodiment

First, prior to describing a configuration of an information processing apparatus according to the present embodiment, an information processing method according to the present embodiment will be described. Hereinafter, the information processing method according to the present embodiment will be described, exemplifying a case in which the information processing apparatus according to the present embodiment performs a process related to the information processing method according to the present embodiment.

The information processing apparatus according to the present embodiment selectively performs a process using information (data) acquired from an application.

When being accessed by an application, the information processing apparatus according to the present embodiment determines whether the accessing application is an application on which a process is to be performed (which will be referred to as a "target application", and selectively performs a process using information acquired from the application based on the result of the determination.

More specifically, the information processing apparatus according to the present embodiment selectively performs a process using information acquired from an application by performing, for example, (1) key information generation process, (2) specific information retaining process, (3) determination process, and (4) execution process to be described below.

Note that the (1) key information generation process, (2) specific information retaining process, (3) determination process, and (4) execution process to be described below are defined by dividing a process related to the information processing method according to the present embodiment into four processes for the sake of convenience. Thus, with regard to the process relating to the information processing method according to the present embodiment, the (1) key information generation process, (2) specific information retaining process, (3) determination process, and (4) execution process to be described below can be understood as one process, or two or more processes. Hereinafter, the case in which the process related to the information processing method according to the present embodiment is divided into the (1) key information generation process, (2) specific information retaining process, (3) determination process, and (4) execution process will be mainly described.

(1) Key Information Generation Process

Upon acquiring first key information from an application, the information processing apparatus according to the present embodiment generates second key information based on the first key information.

The application according to the present embodiment is stored in, for example, a storage unit (to be described below) of the information processing apparatus according to the present embodiment or a recording medium such as an external recording medium connected to the information processing apparatus according to the present embodiment. The application according to the present embodiment is executed by, for example, a processor provided in the information processing apparatus according to the present embodiment.

As a specific example, "Java Card Runtime Environment" having "Java Card Virtual Machine (VM)" for interpreting the Java (registered trademark) language is executed by the processor provided in the information processing apparatus according to the present embodiment. "Java Card Runtime Environment" has a Java Card function stipulated by the Java Card Forum, and a function of managing a plurality of programs as applets (an example of an application) and appropriately switching them. In the information processing apparatus according to the present embodiment, for example, applications are executed and operated by "Java Card VM" on "Java Card Runtime Environment."

Note that the application according to the present embodiment is not limited to such an applet, and may be an application related to another platform other than Java (registered trademark). Hereinafter, a case in which the application according to the present embodiment is an applet will be exemplified.

Here, as key information according to the present embodiment, key data according to any encryption scheme such as a Data Encryption Standard (DES) key or an Advanced Encryption Standard (AES) key is exemplified.

In addition, the first key information according to the present embodiment is key information of which content is not allowed to change. In addition, the second key information according to the present embodiment is key information generated based on first key information and of which content can be changed. As the second key information according to the present embodiment, for example, a session key that is used for encrypting and decrypting data and is valid for a given period or the period from a start to an end of communication. In addition, the second key information according to the present embodiment may be data used for generating other data, for example, key information playing a role of a session key.

Hereinafter, information (data) of which content is not allowed to change like the first key information may be referred to as "static information," and information (data) of which content can be changed like the second key information may be referred to as "dynamic information." As dynamic information according to the present embodiment, for example, a random number value is exemplified.

Information of which content is not allowed to change according to the present embodiment means that the information processing apparatus according to the present embodiment is not allowed to arbitrarily change information (data) acquired from an application by itself.

Focusing on key information, since an application from which information is acquired shares key information with an external apparatus such as a reader/writer, or the like in advance, it is difficult for the application to individually change the value. However, for example, when the application receives a request for a key change from the external apparatus, then allows the change, and informs the external apparatus of the fact that a process therefor has been normally performed, it is possible to change the key information contained in the application by using the new key information that the external apparatus designated, at the next transaction. Although there are methods in which an application and an external apparatus such as a reader/writer change key information in addition to the above method, an objective of the present process is to newly share key information, and therefore, details of the individual methods will not be mentioned. Furthermore, the key change process described above is performed between an application and an external apparatus such as a reader/writer, and is not linked with exchange of key information between the application and the information processing apparatus.

Note that "static" according to the present embodiment may include that, for example, information (data) is saved in a non-volatile memory.

In addition, information of which content can be changed according to the present embodiment means that the information processing apparatus according to the present embodiment can newly create, by itself, data from information acquired from an application.

Note that "dynamic" according to the present embodiment may include that, for example, information is saved in a volatile memory.

The information processing apparatus according to the present embodiment generates the second key information using an arbitrary method in which dynamic information can be generated using the first key information, for example, the second key information is randomly generated using the first key information.

(2) Specific Information Retaining Process

The information processing apparatus according to the present embodiment retains specific information for specifying a target application when the second key information has been generated in the process (1) (key information generation process) described above.

(2-1) First Example of Specific Information Retaining Process

The information processing apparatus according to the present embodiment retains channel information (data) indicating a channel corresponding to the application corresponding to the acquired first key information as specific information.

As the channel according to the present embodiment, for example, a logical channel that is a logical communication path is exemplified.

For example, when "Java Card Runtime Environment" is executed by the processor provided in the information processing apparatus according to the present embodiment, the information processing apparatus according to the present embodiment manages access related to contact communication and access related to contactless communication with different channels. In addition, in this case, the information processing apparatus according to the present embodiment can increase the number of channels for the access related to contact communication using, for example, the protocol of ISO/IEC 7816-3. Here, as contactless communication according to the present embodiment, for example, near field communication (NFC) for performing communication using the magnetic field (carrier) of a predetermined frequency such as 13.56 [MHz] is exemplified.

The information processing apparatus according to the present embodiment retains channel information as specific information by, for example, causing a number indicating the logical channel allocated to the application corresponding to the acquired first key information to be stored in a recording medium such as a non-volatile memory or a temporary memory medium such as a volatile memory (for example, a random access memory (RAM)) as channel information. Note that the channel information according to the present embodiment is not limited to the above, and may be arbitrary data that can indicate the channel corresponding to the application corresponding to the acquired first key information. In addition, the information processing apparatus according to the present embodiment may retain the channel information as specific information using an arbitrary method in which the channel information can be retained.

(2-2) Second Example of Specific Information Retaining Process

The information processing apparatus according to the present embodiment acquires identification information indicating one or two or more applications corresponding to the acquired first key information, and retains the acquired identification information as specific information.

Here, as the identification information according to the present embodiment, for example, data described below is exemplified. Note that the identification information according to the present embodiment is not limited to the examples described below. The identification information according to the present embodiment may be, for example, a combination of a plurality of pieces of data, like a "Context ID" and a "system code."

Context ID

System code managed in association with application ID (AID)

Name of application programming interface (API, when the information is realized using Java (registered trademark))

Process ID (PID, when the information is realized as an operating system (OS) process)

Module ID (when the information is realized in a hypertext preprocessor (PHP) system)

FIG. 1 is an explanatory diagram for describing a Context ID. As shown in A of FIG. 1 and B of FIG. 1, Context is one set in which one or two or more applications are assembled (a so-called package). When a Context ID is used as identification information, the information processing apparatus according to the present embodiment can determine an application corresponding to the same Context ID as the application related to the acquisition of the first key information, other than the application related to the acquisition of the first key information as a target application in the process (3) (determination process) to be described below.

When the application according to the present embodiment is an application of NFC type F, a system code that is defined in, for example, "Global Platform Card—Card Specification V2.2—Amendment C" is managed in association with an AID indicating the application. Here, when the system code is the same, it can be interpreted such that applications are managed by the same service provider. Thus, when a system code is used as identification information, the information processing apparatus according to the present embodiment can determine an application corresponding to the same system code as that of the application related to the acquisition of the first key information other than the application related to the acquisition of the first key information as a target application in the process (3) (determination process) to be described below.

The information is unique as a namespace as "Java package name and Class name" when being realized in Java (registered trademark), and the API name included in Class is unique as well. In addition, the PID is unique since it is an ID used for uniquely managing a process of an OS, and the module ID of the PHP system is also unique.

The information processing apparatus according to the present embodiment has a function of managing identification information, for example, a "Context ID," a "system code," or the like. Exemplifying a specific example, in the information processing apparatus according to the present embodiment, a "Context ID" (an example of the identification information) is managed by "Java Card VM" on "Java Card Runtime Environment" executed by the processor provided in the information processing apparatus according to the present embodiment. The "Java Card VM" executed by the processor provided in the information processing apparatus according to the present embodiment serves as a management unit (to be described below) for managing identification information in the information processing apparatus according to the present embodiment.

Note that the identification information may be managed by a device (for example, an external processor) outside of the information processing apparatus according to the present embodiment or an external apparatus.

In addition, upon acquiring the first key information, the information processing apparatus according to the present embodiment acquires identification information corresponding to the first key information from the identification information being managed. As a specific example, in the information processing apparatus according to the present embodiment, the "Java Card Runtime Environment" executed by the processor provided in the information processing apparatus according to the present embodiment, for example, acquires the identification information from the "Java Card VM."

Upon acquiring the identification information, the information processing apparatus according to the present embodiment, for example, causes the acquired information to be stored in a recording medium such as a non-volatile memory or a temporary memory medium such as a volatile memory to retain the identification information as specific information. Note that the information processing apparatus according to the present embodiment may retain the identification information as specific information using an arbitrary method which enables the identification information to be retained.

The information processing apparatus according to the present embodiment retains such specific information with which a target application is specified when the first key information has been acquired, by performing, for example, the specific information retaining process related to the first example shown in (2-1) above, or the specific information retaining process related to the second example shown in (2-2) above.

(3) Determination Process

Upon being accessed by an application after retaining the specific information through the process (2) (specific information retaining process) described above, the information processing apparatus according to the present embodiment determines whether the accessing application is a target application based on the specific information.

(3-1) First Example of Determination Process: Example of Determination Process when Specific Information is Channel Information The information processing apparatus according to the present embodiment determines whether an accessing application is a target application by determining whether a channel corresponding to the accessing application is a channel indicated by channel information.

When the channel allocated to the accessing application coincides with the channel indicated by the channel information, for example, the information processing apparatus according to the present embodiment determines the accessing application to be a target application. In addition, when the channel allocated to the accessing application does not coincide with the channel indicated by the channel information, the information processing apparatus according to the present embodiment determines the accessing application not to be a target application.

(3-2) Second Example of Determination Process: Example of Determination Process when Specific Information is Identification Information The information processing apparatus according to the present embodiment determines whether an accessing application is a target application by determining whether the accessing application is an application indicated by the identification information.

When the accessing application is the same as the application indicated by the identification information (or when two or more applications indicated by the identification information include the same application as the accessing application), for example, the information processing apparatus according to the present embodiment determines the accessing application to be a target application. In addition, when the accessing application is not the same as the application indicated by the identification information (or when two or more applications indicated by the identification information does not include the same application as the accessing application), for example, the information processing apparatus according to the present embodiment determines the accessing application not to be a target application.

The information processing apparatus according to the present embodiment determines whether an accessing application is a target application by, for example, performing the determination process related to the first example shown in (3-1) above or the determination process related to the second example shown in (3-2) above.

(4) Execution Process

The information processing apparatus according to the present embodiment selectively performs a process based on information acquired from the accessing application and the second key information generated in the process (1) (key information generation process) based on the result of the determination of the process (3) (determination process).

Here, as the "process based on information acquired from the application and the second key information" according to the present embodiment, for example, a "process of encrypting information acquired from the application using the second key information," a "process of decrypting information acquired from the application using the second key information," and a "process of generating new dynamic information from dynamic information acquired from the application and the second key information" are exemplified. In addition, the "process based on information acquired from the application and the second key information" may include, for example, a process of encrypting or decrypting information acquired from the application using new dynamic information generated based on the second key information (for example, session key data generated using the second key information, or the like). Hereinafter, the "process based on information acquired from the application and the second key information" according to the present embodiment may be referred to as a "Crypto process."

When the accessing application is determined to be a target application in the process (3) (determination process), for example, the information processing apparatus according to the present embodiment performs a process based on the information acquired from the accessing application and the second key information generated in the process (1) (key information generation process).

When the accessing application is determined not to be a target application in the process (3) (determination process), for example, the information processing apparatus according to the present embodiment does not perform a process using the information acquired from the accessing application. When the process using the information acquired from the accessing application is not performed, the information processing apparatus according to the present embodiment ignores various requests delivered from the accessing application. In addition, when the process using the information acquired from the accessing application is not performed, for example, the information processing apparatus according to the present embodiment may deliver a response indicating that the process is not performed to the application. Furthermore, when the process using the information acquired from the accessing application is not performed, the information processing apparatus according to the present embodiment presumes to be receiving a hacking process from an unexpected application and may be in a mute state to stop its operation.

As processes related to the information processing method according to the present embodiment, the information processing apparatus according to the present embodiment performs, for example, the process (1) (key information generation process), the process (2) (specific information retaining process), the process (3) (determination process), and the process (4) (execution process).

Here, the information processing apparatus according to the present embodiment retains specific information triggered by access of the application for the acquisition of the first key information in the process (2) (specific information retaining process). In addition, the information processing apparatus according to the present embodiment determines whether the accessing application is a target application based on the retained specific information in the process (3) (determination process). Then, when it is determined to be a target application in the process (3) (determination process), the information processing apparatus according to the present embodiment performs a process based on the information acquired from the accessing application and the second key information generated in the process (1) (key information generation process) in the process (4) (execution process).

Thus, when the information processing apparatus according to the present embodiment performs the process (1) (key information generation process) to the process (4) (execution process), the information processing apparatus according to the present embodiment does not perform a process using the information acquired from the application that is not determined as a target application in the state in which the specific information is retained.

Therefore, the information processing apparatus according to the present embodiment can perform a process using the information acquired from the specific application by performing the process (1) (key information generation process) to the process (4) (execution process) as processes related to the information processing method according to the present embodiment.

Note that processes relating to the information processing method according to the present embodiment is not limited to the process (1) (key information generation process) to the process (4) (execution process).

For example, the information processing apparatus according to the present embodiment can further perform a process of cancelling the state in which the specific information is retained (cancellation process).

When information indicating termination of the process (for example, a Reset process request to be described below) is delivered from the target application, for example, the information processing apparatus according to the present embodiment cancels the state in which the specific information is retained by deleting the specific information stored in the recording medium from the recording medium. In addition, the information processing apparatus according to the present embodiment may further set the state to be invalid by deleting the second key information.

As the information processing apparatus according to the present embodiment performs the (5) cancellation process, the information processing apparatus according to the present embodiment can newly perform the process (1) (key information generation process) to the process (4) (execution process) based on newly acquired first key information. Note that, by performing the process (1) (key information generation process), the information processing apparatus according to the present embodiment overwrites information acquired from the target application, and thus can newly perform a process without executing the (5) cancellation process.

Information Processing Apparatus According to Embodiment

Next, an example of the configuration of the information processing apparatus according to the present embodiment capable of performing the process related to the information processing method according to the present embodiment will be described.

Hereinafter, a case in which the information processing apparatus according to the present embodiment is an apparatus that constitutes an information processing system that can perform contactless communication with a reader/writer (or an apparatus having a reader/writer function, and the same applies hereinafter) will be exemplified.

Figure 2:
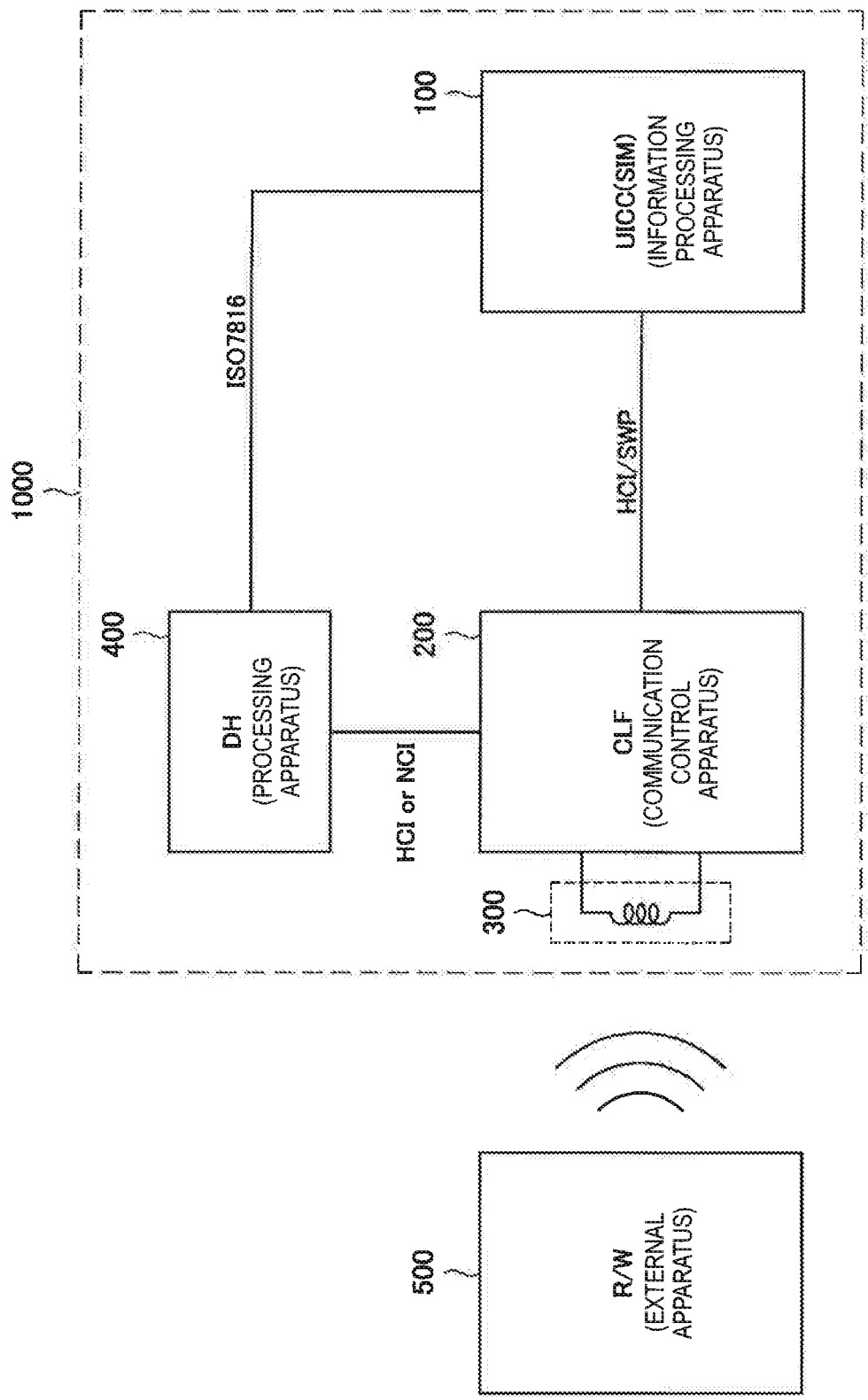
FIG. 2 is an explanatory diagram illustrating an example of a configuration of an information processing system according to the present embodiment.

[1] Example of Configuration of Information Processing System According to Present Embodiment FIG. 2 is an explanatory diagram illustrating an example of the configuration of the information processing system 1000 according to the present embodiment. In FIG. 2, an external apparatus 500 for outputting the magnetic field (carrier) of the predetermined frequency such as 13.56 [MHz] is also illustrated. Also, in FIG. 2, a reader/writer (which may hereinafter be referred to as an "R/W") is illustrated as an example of the external apparatus 500.

The information processing system 1000 includes, for example, an information processing apparatus 100, a communication control apparatus 200, an antenna 300, and a processing apparatus 400.

In FIG. 2, an universal integrated circuit card (UICC) or a subscriber identity module (SIM) is illustrated as an example of the information processing apparatus 100 and a CLF is illustrated as an example of the communication control apparatus 200. In FIG. 2, a device host (DH) is illustrated as an example of the processing apparatus 400.

FIG. 2 illustrates an example in which the information processing apparatus 100 and the communication control apparatus 200 perform communication via communication interfaces such as a host controller interface (HCI) and a single wire protocol (SWP). FIG. 2 also illustrates an example in which the information processing apparatus 100 and the processing apparatus 400 perform communication via a communication interface based on the ISO7816 standard. FIG. 2 also illustrates an example in which the communication control apparatus 200 and the processing apparatus 400 perform communication via an HCI or an NFC controller interface (NCI). The communication interfaces for performing the communication between the apparatuses included in the information processing system 1000 are not limited to the examples illustrated in FIG. 2. For example, the apparatuses included in the information processing system 1000 may perform communication via any communication interface or protocol enabling the apparatuses to perform the communication.

[1-1] Overview of Information Processing Apparatus 100

The information processing apparatus 100 performs the processes related to the information processing method according to the present embodiment described above, and performs a process using information acquired from a specific application.

For example, the information processing apparatus 100 performs processes based on various signals transmitted from the external apparatus 500 when the various signals transmitted from the external apparatus 500 are received from the communication control apparatus 200. Also, the information processing apparatus 100 may perform the process, for example, in conjunction with an external apparatus (or external apparatus) such as the processing apparatus 400. Then, the information processing apparatus 100 transmits response signals according to processing results to the communication control apparatus 200.

[1-2] Overview of Communication Control Apparatus 200

The communication control apparatus 200 performs contactless communication with the external apparatus 500. For example, the communication control apparatus 200 performs the contactless communication with the external apparatus 500 by receiving a signal transmitted from the external apparatus 500 via the antenna 300 connected thereto, and transmitting a signal via the antenna 300 performing load modulation. As the antenna 300, for example, an inductor having predetermined inductance can be exemplified.

Also, the communication control apparatus 200 communicates with the information processing apparatus 100 via communication interfaces such as the HCI and the SWP.

The communication control apparatus 200 causes various types of signals transmitted from the external apparatus 500, for example, transmitted via the antenna 300, to be transmitted to the information processing apparatus 100.

In FIG. 2, the example in which the communication control apparatus 200 performs the contactless communication with the external apparatus 500 via the antenna 300 connected thereto is illustrated. However, the communication control apparatus 200 may include the antenna 300.

[1-3] Overview of Processing Apparatus 400

The processing apparatus 400 includes a processor that includes a micro processing unit (MPU) or various processing circuits and performs various processes. As the processes performed by the processing apparatus 400, for example, a process in conjunction with the information processing apparatus 100 through communication, a process related to the communication with the communication control apparatus 200, and a process that the processing apparatus 400 performs by itself can be exemplified.

The information processing system 1000 has, for example, the configuration illustrated in FIG. 2.

The configuration of the information processing system according to the present embodiment is not limited to the example illustrated in FIG. 2.

Figure 3:
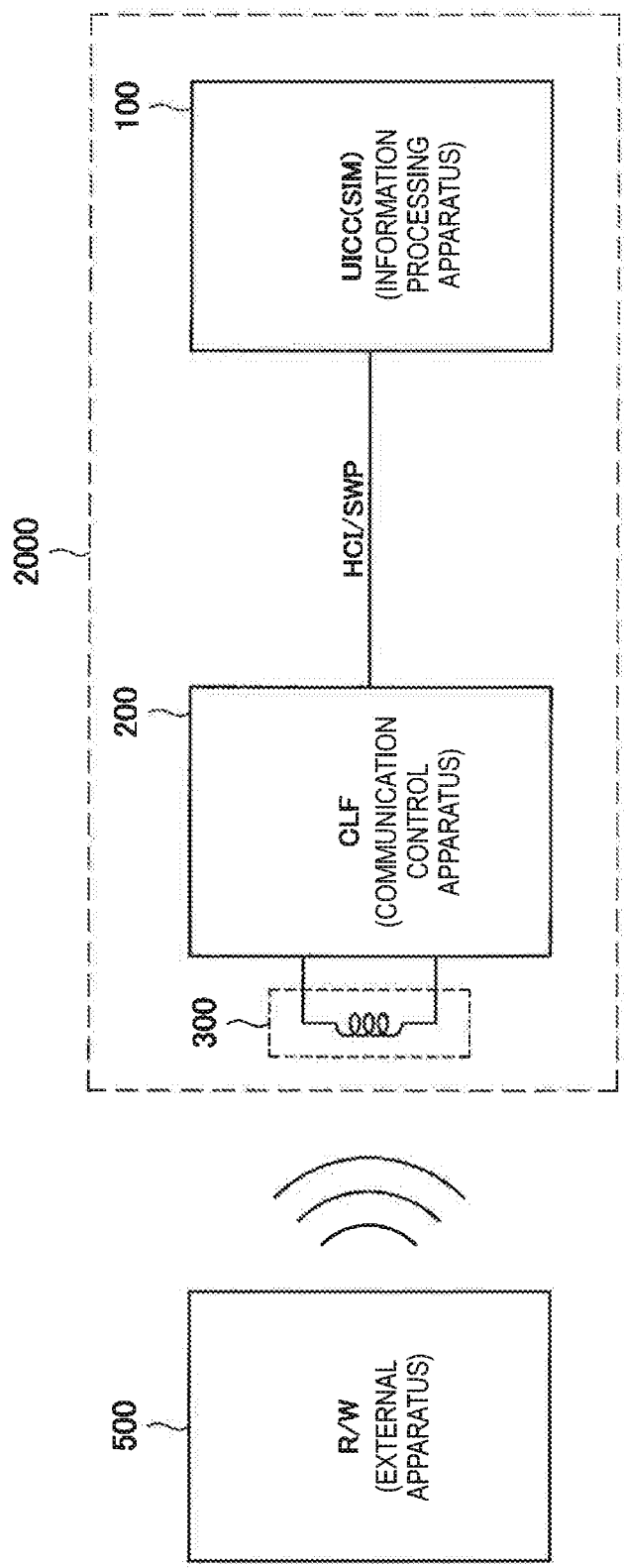
FIG. 3 is an explanatory diagram illustrating an example of a configuration of an information processing system according to the present embodiment according to another example.

FIG. 3 is an explanatory diagram illustrating an example of a configuration of an information processing system 2000 according to the present embodiment according to another example. For example, as in the information processing system 2000 illustrated in FIG. 3, it may be unnecessary for the information processing system according to the present embodiment to have the processing apparatus 400.

The configuration of the information processing system according to the present embodiment is not limited to the example illustrated in FIG. 2 or FIG. 3.

The information processing system according to the present embodiment may be, for example, an apparatus in which the information processing apparatus 100 and the communication control apparatus 200 illustrated in FIG. 2 and FIG. 3 are integrated, or may be an apparatus in which the information processing apparatus 100, the communication control apparatus 200, and the antenna 300 are integrated. When the information processing system is the apparatus in which the information processing apparatus 100, the communication control apparatus 200, and the antenna 300 are integrated, the integrated apparatus is referred to as, for example, a "microSD" in some cases. Here, "micro" is a size of a shape, but the size is not necessarily uniquely designated and is not limited to various types of standards including an SD card. Alternatively, even if it is an integrated apparatus, an information managing function that is necessary for being connected to a base station is mounted, and thus an apparatus referred to as a UICC (SIM) is considered likewise.

For example, the information processing system according to the present embodiment may have a configuration in which the information processing apparatus 100 illustrated in FIG. 2 is internally included in the processing apparatus 400. When the information processing apparatus 100 is configured to be internally included in the processing apparatus 400, the information processing apparatus 100 is referred to as, for example, a trusted execution environment (TEE) in some cases.

For example, the information processing system according to the present embodiment may have a configuration in which the information processing apparatus 100, the communication control apparatus 200, and the processing apparatus 400 illustrated in FIG. 2 are integrated, that is, a configuration in which the information processing system according to the present embodiment is set as a single apparatus. In addition, when the information processing apparatus 100, the communication control apparatus 200, and the processing apparatus 400 illustrated in FIG. 2 are an integrated apparatus, the apparatus may further include the antenna 300.

The information processing system according to the present embodiment may be, for example, an apparatus in which the communication control apparatus 200 and the processing apparatus 400 illustrated in FIG. 2 are integrated.

When the information processing system according to the present embodiment has, for example, any of the several configurations described above, the information processing apparatus 100 (or an apparatus corresponding to the information processing apparatus 100) included in the information processing system according to the present embodiment performs a process related to the information processing method according to the present embodiment described above. Thus, even when the information processing system according to the present embodiment has any configuration described above, the system can perform a process using information acquired from a specific application.

In the information processing system according to the present embodiment, the information processing apparatus 100 can also be detachably mounted. When the information processing apparatus 100 can be detachably mounted, the information processing apparatus 100 is referred to as, for example, a "UICC" in some cases. When the information processing apparatus 100 may not be detachably mounted, the information processing apparatus 100 is referred to as, for example, an "eUICC" in some cases. For example, when the information processing system according to the present embodiment is a communication apparatus such as a mobile phone and the information processing apparatus 100 does not store information necessary for connection with a general public wireless line, the information processing apparatus 100 is referred to as, for example, an "eSE" in some cases. When the information processing apparatus 100 can be detachably mounted, the information processing apparatus 100 can perform the process related to the information processing method according to the present embodiment described above, for example, in the information processing system according to any embodiment on which the information processing apparatus 100 is mounted. In more detail, when the information processing apparatus 100 is combined with the communication control apparatus 200 according to any kind of embodiment, the information processing apparatus 100 can perform the process related to the information processing method according to the present embodiment described above.

[2] Example of Configuration of Information Processing Apparatus according to Present Embodiment Next, an example of the configuration of the information processing apparatus according to the present embodiment capable of performing the process related to the information processing method according to the above-described embodiment will be described.

Figure 4:
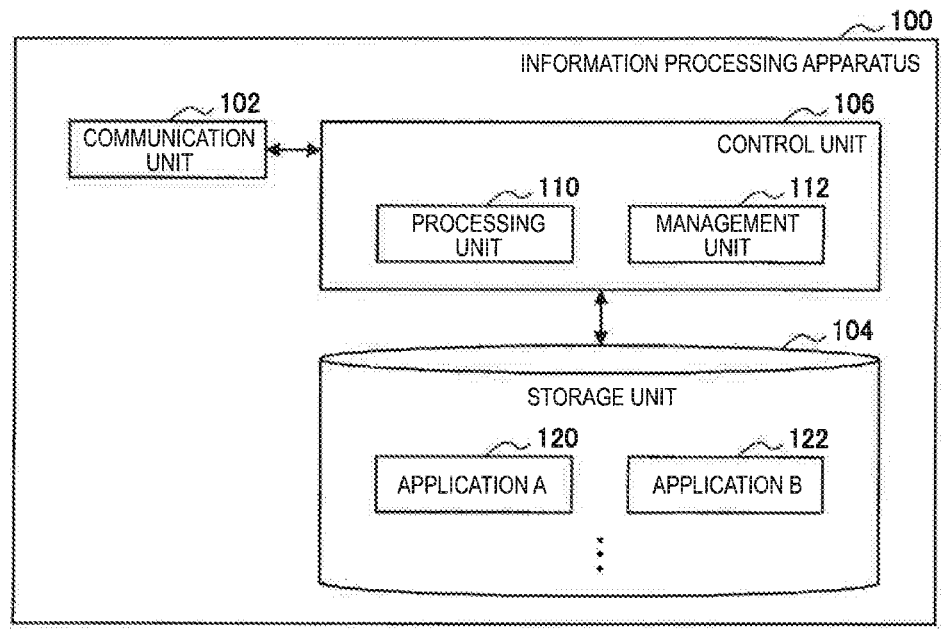
FIG. 4 is a block diagram illustrating an example of the configuration of the information processing apparatus according to the present embodiment.

FIG. 4 is a block diagram illustrating an example of the configuration of the information processing apparatus 100 according to the present embodiment. The information processing apparatus 100 includes, for example, a communication unit 102, a storage unit 104, and a control unit 106.

The information processing apparatus 100 may include, for example, a read-only memory (ROM) (not illustrated) and a random access memory (RAM) (not illustrated). In the information processing apparatus 100, for example, the constituent elements are connected by a bus serving as a data transmission path. Also, the information processing apparatus 100 is driven by obtaining power from a battery such as a provided secondary battery or an external power supply.

Here, the ROM (not illustrated) stores programs used by the control unit 106 or control data such as calculation parameters. The RAM (not illustrated) temporarily stores programs executed by the control unit 106.

[Example of Hardware and Software Configurations of Information Processing Apparatus 100]

Figure 5:
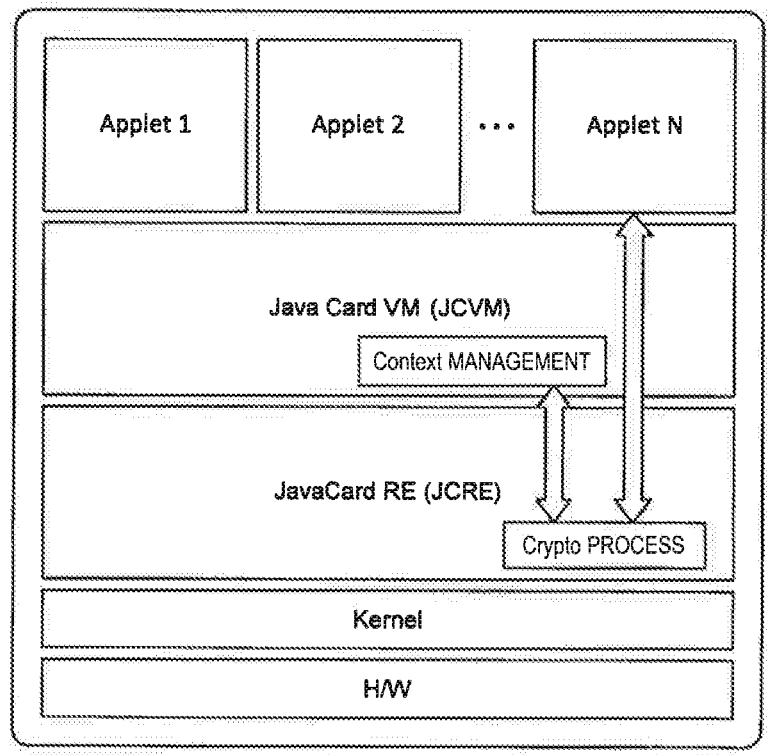
FIG. 5 is an explanatory diagram illustrating examples of hardware and software configurations of the information processing apparatus according to the present embodiment.

FIG. 5 is an explanatory diagram illustrating examples of the hardware and software configurations of the information processing apparatus 100 according to the present embodiment.

The hardware ("H/W" illustrated in FIG. 5) included in the information processing apparatus 100 is configured to include one or more processors (not illustrated) including an MPU or various processing circuits, a ROM (not illustrated), a RAM (not illustrated), a recording medium (not illustrated), and a communication interface (not illustrated).

One or more processors (not illustrated) functions as the control unit 106 controlling the entire information processing apparatus 100. One or more processors (not illustrated) execute software constituting the information processing apparatus 100. In the information processing apparatus 100, the processor (not illustrated) serves as, for example, a processing unit 110 and a management unit 112 to be described below.

The communication interface (not illustrated) functions as the communication unit 102 performing communication with another constituent element, such as the communication control apparatus 200 or the processing apparatus 400 included in the information processing system according to the present embodiment. As the communication interface (not illustrated), for example, a communication interface related to HCI and SWP or a communication interface based on the ISO7816 standard including a Universal Serial Bus (USB) can be exemplified. The communication interface (not illustrated) may be a communication device using any scheme capable of performing communication with another constituent element included in the information processing system according to the present embodiment. The information processing apparatus 100 can include one or two or more communication interfaces (not illustrated). As such an interface, for example, an interface for a SD card, a high-definition multimedia interface (HDMI) (registered trademark), an IEEE 802.15.1 port, a transmitting and receiving circuit, or the like can be exemplified.

As the software included in the information processing apparatus 100, as illustrated in FIG. 5, for example, a kernel (a kernel illustrated in FIG. 5), "Java Card Runtime Environment," "Java Card VM," and various applications (applet N, N is a positive integer, illustrated in FIG. 5) can be exemplified. An application included in the software included in the information processing apparatus 100 may also be added or erasable.

Here, an example of software constituting the information processing apparatus 100 illustrated in FIG. 5, and a relationship between the software constituting the information processing apparatus 100 illustrated in FIG. 5 and the configuration of the information processing apparatus 100 according to the present embodiment illustrated in FIG. 4 will be described.

For example, the communication unit 102 is implemented by mounting a communication protocol such as SWP in the kernel.

The "Java Card Runtime Environment", "Java Card VM", and various applications are executed by the processors constituting the control unit 106. As described above, the "Java Card Runtime Environment" has "Java Card VM" that interprets the Java (registered trademark) language and has a function of executing the program.

The processing unit 110 and the management unit 112 are realized in, for example, the kernel or the "Java Card Runtime Environment", and "Java Card VM" part executed by the processors constituting the control unit 106 (the processors serving as the processing unit 110 and the management unit 112). As a specific example, the processing unit 110 is realized in the "Java Card Runtime Environment" part executed by, for example, a processor or the like as indicated by the "Crypto process" in FIG. 5. In addition, the management unit 112 is realized in the "Java Card VM" part executed by, for example, a processor or the like as indicated by the "Context management" in FIG. 5.

The information processing apparatus 100 has, for example, the configuration illustrated in FIG. 5 and performs the processes related to the information processing method according to the present embodiment. It is needless to say that the hardware and software configuration examples of the information processing apparatus 100 according to the present embodiment are not limited to the configuration illustrated in FIG. 5.

Referring back to FIG. 4, an example of the configuration of the information processing apparatus 100 will be described. For example, the communication unit 102 performs communication with each of one or two or more other constituent elements, such as the communication control apparatus 200 and the processing apparatus 400, included in the information processing system according to the present embodiment. As the communication unit 102, for example, a communication interface related to the HCI and SWP or a communication interface based on the ISO7816 standard including a USB can be exemplified.

The storage unit 104 stores various types of data, for example, data related to the information processing method according to the present embodiment such as specific information, applications, and the like. FIG. 4 shows an example in which an application A 120, an application B 122, and the like are stored in the storage unit 104.

Here, as the storage unit (not illustrated), a recording medium, for example, a non-volatile memory, or a flash memory, can be exemplified. For example, the storage unit 104 may be a recording medium having a tamper-resistant property or may be detachably mounted on the information processing apparatus 100.

The control unit 106 is configured to include processors such as an MPU and serves to control the entire information processing apparatus 100. The control unit 106 includes, for example, the processing unit 110 and the management unit 112 and plays a leading role of performing the processes related to the information processing method according to the present embodiment.

The processing unit 110 plays a leading role in performing the processes related to the information processing method according to the present embodiment. When the information processing apparatus 100 has the hardware and software configuration shown in FIG. 5, the processing unit 110 performs the processes related to the information processing method according to the present embodiment using, for example, the "Java Card Runtime Environment" executed by a processor.

The processing unit 110 selectively performs a process using a process using information acquired from an application stored in the storage unit 104 by performing, for example, "the process (1) (key information generation process) to the process (4) (execution process)" or, "the process (1) (key information generation process) to the process (4) (execution process), and the process (5) (cancellation process)." Note that the processing unit 110 can also selectively perform a process using a process using information acquired from an application stored in a recording medium outside the information processing apparatus 100.

Here, when the information processing apparatus 100 constitutes the information processing system as shown in FIG. 2 or FIG. 3, the processing unit 110 and a target application can jointly process information transmitted from the external apparatus 500. An example in which the processing unit 110 and a target application jointly process information transmitted from the external apparatus 500 will be described below.

In addition, in the information processing apparatus 100, for example, one or two or more processors serve as the processing unit 110. The processing unit 110, for example, may perform processes using one processor, or by sharing the processes among a plurality of processors, regardless of a way of dividing the processes related to the information processing method according to the present embodiment.

The management unit 112 manages identification information. When the information processing apparatus 100 has the hardware and software configuration illustrated in FIG. 5, the management unit 112 manages Context ID (an example of identification information) using, for example, the "Java Card VM" executed by a processor, or the like.

In addition, when the processing unit 110 performs the specific information retaining process shown in (2-2) above in the process (2) (specific information retaining process), the processing unit acquires identification information from the management unit 112.

The control unit 106 plays a leading role in performing the processes related to the information processing method according to the present embodiment by being provided with the processing unit 110 and the management unit 112.

The information processing apparatus 100 performs the processes related to the information processing method according to the present embodiment (for example, "the process (1) (key information generation process) to the process (4) (execution process)," or "the process (1) (key information generation process) to the process (4) (execution process), and the process (5) (cancellation process)") with, for example, the configuration illustrated in FIG. 4.

Thus, the information processing apparatus 100 can perform a process using information acquired from a specific application with, for example, the configuration illustrated in FIG. 4. In addition, the information processing apparatus 100 can exhibit the effect caused by performing the processes related to the information processing method according to the present embodiment with, for example, the configuration illustrated in FIG. 4.

Note that a configuration of the information processing apparatus according to the present embodiment is not limited to the configuration illustrated in FIG. 4.

For example, the information processing apparatus according to the present embodiment can have a configuration in which the management unit 112 illustrated in FIG. 6 is not provided. Even when not provided with the management unit 112, the information processing apparatus according to the present embodiment can perform the processes related to the information processing method according to the present embodiment. Therefore, even when not provided with the management unit 112, the information processing apparatus according to the present embodiment can perform a process using information acquired from a specific application.

In addition, the information processing apparatus according to the present embodiment can be provided with, for example, one or both of the processing unit 110 and the management unit 112 illustrated in FIG. 4, separate from the control unit 106 (for example, which can be realized with a separate processing circuit).

In addition, the information processing apparatus according to the present embodiment may be further provided with, for example, a communication control unit (not illustrated) serving as the communication control apparatus 200 illustrated in FIGS. 2 and 3. As the communication control unit (not illustrated), for example, a CLF is exemplified. When the information processing apparatus according to the present embodiment is further provided with the communication control unit (not illustrated) that can perform contactless communication with an external apparatus using a carrier, the processing unit 110 and a target application of the information processing apparatus according to the present embodiment jointly process information transmitted from an external apparatus.

In addition, the information processing apparatus according to the present embodiment may be further provided with, for example, the communication control unit (not illustrated) serving as the communication control apparatus 200 illustrated in FIGS. 2 and 3 and an antenna having a configuration and function similar to those of the antenna 300 illustrated in FIGS. 2 and 3. In the information processing apparatus according to the present embodiment having the configuration, the communication control unit (not illustrated) communicates with an external apparatus via the antenna.

In addition, for example, when communication is performed with one or two or more other constituent elements constituting the information processing system according to the present embodiment such as the communication control apparatus 200 or the processing apparatus 400 via an external communication device having a function and configuration similar to those of the communication unit 102, the communication unit 102 may not be provided. In addition, for example, when the information processing apparatus according to the present embodiment is further provided with a communication control unit (not illustrated) serving as the communication control apparatus 200 in the information processing system 2000 illustrated in FIG. 3, the communication unit 102 may not be provided.

[3] Specific Example of Process Performed in Information Processing Apparatus According to Present Embodiment Next, a specific example of a process performed in the information processing apparatus according to the present embodiment will be described. Hereinafter, the information processing apparatus according to the present embodiment is, for example, the information processing apparatus 100 constituting the information processing system 2000 illustrated hi FIG. 3, and an example of a process when the apparatus has the configuration illustrated in FIG. 4 will be shown.

Figure 6A:
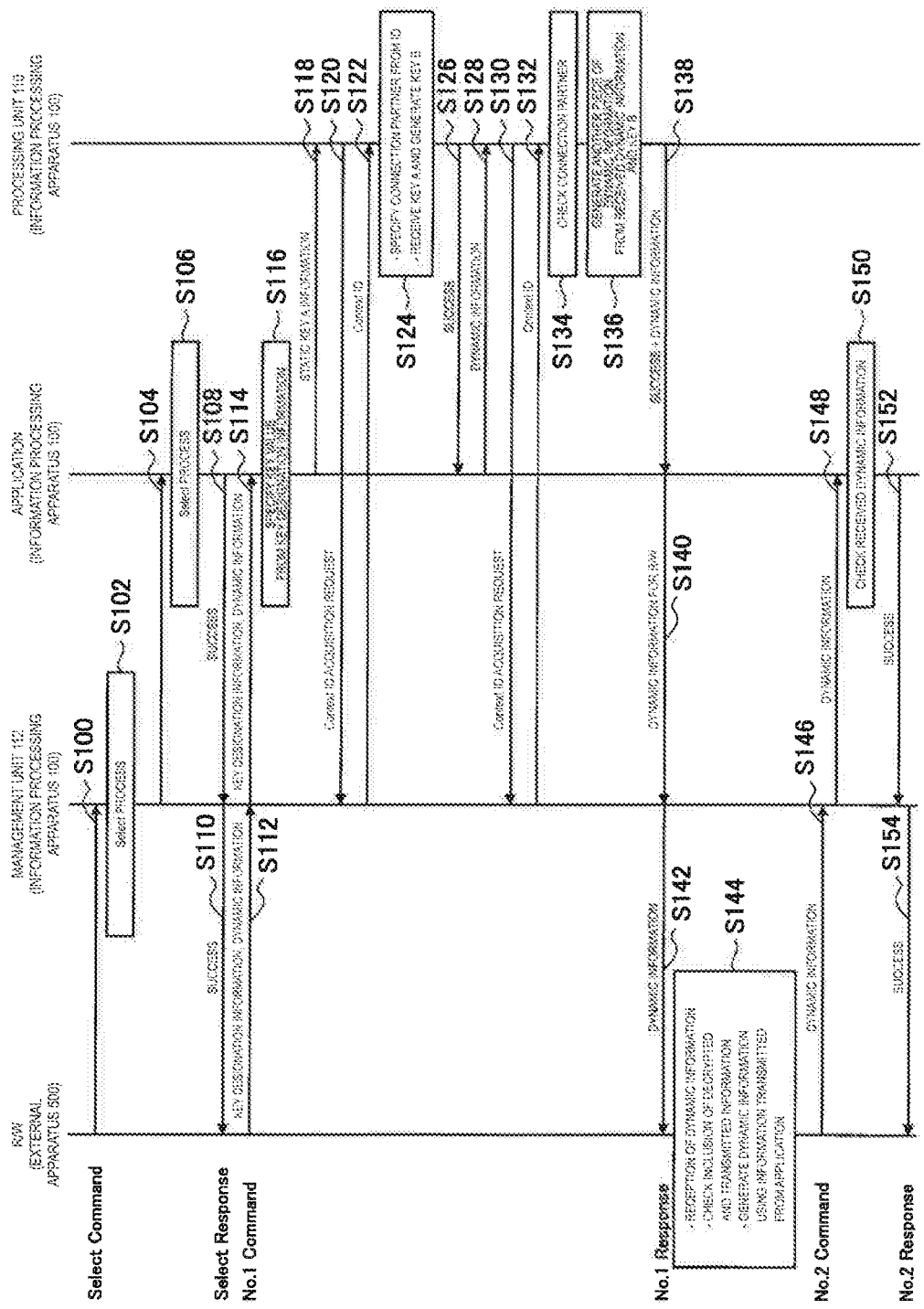
FIG. 6A is an explanatory diagram for describing an example of a process performed in the information processing apparatus according to the present embodiment.

FIGS. 6A and 6B are explanatory diagrams for describing an example of a process performed in the information processing apparatus 100 according to the present embodiment. In FIGS. 6A and 6B, the communication control apparatus 200 and the antenna 300 shown in FIG. 3 are omitted for the sake of convenience. In addition, in FIGS. 6A and 6B, the external apparatus 500 illustrated in FIG. 3 is indicated as "R/W."

When the information processing apparatus 100 has the hardware and software configuration shown in FIG. 5, for example, the "Java Card Runtime Environment" executed by a processor, or the like serves as the processing unit 110. In addition, when the information processing apparatus 100 has the hardware and software configuration shown in FIG. 5, for example, the "Java Card VM" executed by a processor, or the like serves as the management unit 112.

Here, a part of the process of Step S120 and the process of Step S124 performed by the processing unit 110 shown in FIG. 6A correspond to the process (2) (specific information retaining process). In addition, a part of the process of Step S124 performed by the processing unit 110 shown in FIG. 6A corresponds to the process (1) (key information generation process). In addition, the process of Step S130 and the process of Step S134 performed by the processing unit 110 shown in FIG. 6A, the process of Step S162 performed by the processing unit 110 shown in FIG. 6B, a part of the process of Step S166 performed by the processing unit 110 shown in FIG. 6B, the process of Step S174 performed by the processing unit 110 shown in FIG. 6B, a part of the process of Step S178 performed by the processing unit 110 shown in FIG. 6B, the process of Step S194 performed by the processing unit 110 shown in FIG. 6B, and a part of the process of Step S198 performed by the processing unit 110 shown in FIG. 6B correspond to the process (3) (determination process). In addition, the process of Step S136 performed by the processing unit 110 shown in FIG. 6A, a part of the process of Step S166 performed by the processing unit 110 shown in FIG. 6B, and a part of the process of Step S178 performed by the processing unit 110 shown in FIG. 6B correspond to the process (4) (execution process). Furthermore, a part of the process of Step S198 performed by the processing unit 110 shown in FIG. 6B corresponds to the process (5) (cancellation process).

In addition, the process between the application and the processing unit 110 shown in Steps S160, S166 to S172, S178, and S180 of FIG. 6B, for example, is an example of a process being jointly performed with respect to ciphertext transmitted from the external apparatus 500 (an example of information (data) transmitted from the external apparatus).

The external apparatus 500 transmits a Select Command for selecting an application (S100).

The management unit 112 that has received the Select Command transmitted from the external apparatus 500 selects the application indicated by the Select Command (S102), and thereby the application corresponding to the Select Command is selected. The Select Command is transferred to the target application (S104), and the target application executes a Select process corresponding to the Select Command (S106).

The normally selected application delivers a response indicating that the process according to the Select Command has succeeded to the management unit 112 (S108), and the management unit 112 causes the response indicating that the process according to the Select Command has succeeded to be transmitted to the external apparatus 500 as a Select Response (S110).

The external apparatus 500 that has received the response indicating that the process according to the Select Command had succeeded transmits key designation information and dynamic information (S112).

The management unit 112 that has received the key designation information and dynamic information transmitted from the external apparatus 500 delivers the key designation information and dynamic information to the application (S114).

The application to which the key designation information and dynamic information have been delivered specifies a key value designated by the key designation information (S116), and delivers static key A information (first key information) indicating a specific key value to the processing unit 110 (S118).

The processing unit 110 that has acquired the key A information from the application through the delivery of the key A information delivers a Context ID acquisition request including a command for transmitting a Context ID to the management unit 112 (S120).

The management unit 112 to which the Context ID acquisition request has been delivered delivers the Context ID corresponding to the selected application to the processing unit 110 (S122).

The processing unit 110 retains the Context ID and specifies the target application, and generates dynamic key B information (second key information) using the key A information acquired in Step S118 (S124). The processing unit 110 generates the key B information by performing, for example, a predetermined process such as data conversion or encryption on the key A information. Note that a method for generating the key B information is not limited to the above, and the key B information can be generated using any method that can generate dynamic information using the key A information.

If the process of Step S124 is normally performed, the processing unit 110 gives a response indicating that the process has succeeded to the application which delivered the key A information in Step S118 (S126).

The application to which the response indicating that the process had succeeded has been delivered delivers dynamic information to the processing unit 110 (S128). The process of Step S128 is an example of a case of the application accessing the processing unit 110 after the specific information is retained.

The processing unit 110 that has acquired the dynamic information through delivery of the dynamic information in Step S128 delivers a Context ID acquisition request to the management unit 112 as in Step S120 (S130). Then, the management unit 112 delivers the Context ID to the processing unit 110 as in Step S122 (S132).

Based on the Context ID acquired in Step S132 and the retained Context ID (an example of specific information), the processing unit 110 determines whether the application is a target application (S134). When the acquired Context ID coincides with the retained Context ID, the processing unit 110 determines that the application is a target application.

When the application is determined to be a target application in Step S134, the processing unit 110 generates another piece of dynamic information based on the dynamic information acquired in Step S128 and the key B information generated in Step S124 (S136). Here, the other piece of dynamic information generated in Step S136 by the processing unit 110 includes, for example, data serving as a session key.

When the process of Step S136 is normally performed, the processing unit 110 delivers a response indicating that the process has been normally performed and a part or all of the dynamic information Generated in Step S136 to the application (S138).

The application to which the response indicating that the process had been normally performed and the dynamic information has been delivered delivers the dynamic information to the management unit 112 (S140). Here, the application may deliver a part or all of the dynamic information delivered in Step S138 to the management unit 112, or may deliver dynamic information obtained by adding a change to the dynamic information delivered in Step S138 to the management unit 112.

The management unit 112 to which the dynamic information has been delivered causes the dynamic information to be transmitted to the external apparatus 500 (S142).

The external apparatus 500 that has received the dynamic information generates another piece of dynamic information using the received dynamic information (S144). Then, the external apparatus 500 transmits the dynamic information generated in Step S144 (S146).

The management unit 112 that has received the dynamic information transmitted from the external apparatus 500 delivers the received dynamic information to the selected application (S148). The application to which the dynamic information has been delivered checks the delivered dynamic information (S150). When the process of Step S150 is normally performed, the application delivers a response indicating that the process has been normally performed to the management unit 112 (S153), and the management unit 112 causes the delivered response indicating that the process has been normally performed to be transmitted to the external apparatus 500 (S154).

The external apparatus 500 that has received the response indicating that the process had been normally performed transmits ciphertext (S156).

The management unit 112 that has received the ciphertext transmitted from the external apparatus 500 delivers the received ciphertext to the selected application (S158).

The application to which the ciphertext has been delivered delivers the delivered ciphertext to the processing unit 110 (S160). The process of Step S160 is an example of a case of the application accessing the processing unit 110 after the specific information is retained.

The processing unit 110 which has acquired the ciphertext through delivery of the ciphertext in Step S160 delivers a Context ID acquisition request to the management unit 112 as in Step S120 (S162). Then, the management unit 112 delivers the Context ID to the processing unit 110 as in Step S122 (S164).

As in Step S134, the processing unit 110 determines whether the application is a target application based on the Context ID acquired in Step S164 and the retained Context ID (an example of specific information). Then, when the application is determined to be a target application, the processing unit 110 decrypts the ciphertext delivered in Step S160 using the generated key information (for example, the dynamic information generated in Step S136) (S166).

The processing unit 110 delivers the plain text resulting from the decryption in Step S166 to the application (S168).

The application processes the delivered plain text (S170), and delivers the plain text indicating the process result to the processing unit 110 (S172). The process of Step S172 is an example of a case of the application accessing the processing unit 110 after the specific information is retained.

The processing unit 110 that has acquired the plain text through delivery of the plain text in Step S172 delivers a Context ID acquisition request to the management un it 112 as in Step S120 (S174). Then, the management unit 112 delivers the Context ID to the processing unit 110 as in Step S122 (S176).

The processing unit 110 determines whether the application is a target application based on the Context ID acquired in Step S176 and the retained Context ID (an example of specific information) as in Step S134. Then, when the application is determined to be a target application, the processing unit 110 encrypts the plain text delivered in Step S172 using the generated key information (for example, dynamic information generated in Step S136) (S178).

The processing unit 110 delivers the ciphertext resulting from the encryption in Step S178 to the application (S180).

The application to which the ciphertext has been delivered delivers the ciphertext to the management unit 112 (S182). The management unit 112 to which the ciphertext has been delivered causes the ciphertext to be transmitted to the external apparatus 500 (S184).

The external apparatus 500 transmits a Select Command for causing an application that is different from the application indicated by the Select Command transmitted in Step S100 to be selected (S186).

The management unit 112 that has received the Select Command transmitted from the external apparatus 500 cancels the selection of the selected application (S188 and S190). The application notified of the cancellation of the selection delivers a Reset process request (an example of information indicating that the process will be terminated) to the processing unit 110 (S192). The process of Step S192 is an example of a case of the application accessing the processing unit 110 after the specific information is retained.

The processing unit 110 that has acquired the Reset process request through the delivery of the Reset process request in Step S192 delivers a Context ID acquisition request to the management unit 112 as in Step S120 (S194). Then, the management unit 112 delivers the Context ID to the processing unit 110 as in Step S122 (S196).

The processing unit 110 determines whether the application is a target application based on the Context ID acquired in Step S196 and the retained Context ID (an example of the specific information) as in Step S134. Then, when the application is determined to be a target application, the processing unit 110 deletes and thereby nullifies data related to the target application, for example, the specific information, the key B information, or the like based on the Reset process request (S198).

When the process of Step S198 is normally performed, the processing unit 110 delivers a response that the process has been normally performed to the application (S200). Note that the process of Step S200 is an example, and because the processing time taken for the nullification is anticipated to be long, there can be a case in which the processing unit 110 does not reply with a response indicating that the process has succeeded.

The application to which the response indicating that the process has been normally performed delivers the response indicating that the process has been normally performed to the management unit 112 (S202). Regardless of the process of Step S198, the same applies to a case in which a response indicating that all processes corresponding to the Deselect process of the application have been properly performed is delivered to the management unit 112.

The management unit 112 to which the response indicating that the process has been normally performed selects an application indicated by the Select Command transmitted from the external apparatus 500 in Step S186 (S204). The management unit 112 hands over the Select Command to the other corresponding application (S206). The target application processes the received Select Command (S208).

The normally selected other application delivers a response indicating that a process has succeeded according to the Select Command to the management unit 112 (S210), and the management unit 112 causes the response indicating that the process has succeeded according to the Select Command to be transmitted to the external apparatus 500 as a Select Response (S212).

In the information processing system including the information processing apparatus 100 according to the present embodiment, for example, the processes shown in, for example, FIGS. 6A and 6B are performed. When the processes shown in FIGS. 6A and 6B are performed, the information processing apparatus 100 determines an application (an example of the target application) selected using a Select Command transmitted from the external apparatus 500, and processes information acquired from the application using the generated key B information (an example of the second key information). Thus, the information processing apparatus 100 can perform a process using the information acquired from the specific application through the processes shown in FIGS. 6A and 6B.

In addition, as shown in FIGS. 6A and 6B, as timings at which the application accesses the processing unit 110, for example, three timings shown in (a) to (c) below are exemplified.

(a) When static key information is handed over to the processing unit 110 (for example, Step S118 of FIG. 6A)

(b) When an application hands over dynamic information for generating dynamic information such as a session key to the processing unit 110 (for example, Step S128 of FIG. 6A)

(c) When an application hands over data (ciphertext or plain text) to the processing unit 110 in order to acquire data (plain text or ciphertext) from the processing unit 110 (for example, Steps S160 and S172 of FIG. 6B)

Here, to understand it from the perspective of security, the static information handed over in (a) above is information of which content is not allowed to change as viewed from the processing unit 110, and is, for example, important data retained in the information processing apparatus 100. In addition, while the dynamic information handed over in (c) above is data processed based on key information generated by the processing unit 110, the dynamic information handed over in (b) above is data used for generating another piece of dynamic information. Thus, to understand it from the perspective of security, the dynamic information handed over in (b) above can be said to be more important data than the dynamic information handed over in (c) described above.

Therefore, implementation of a security aspect of the information processing apparatus 100 may be changed. As a method for changing the implementation of the security aspect, for example, changing the degree of a measure for Differential Power Analysis (DPA) or Differential Fault Analysis (DFA) in the order of (a), (b), and (c) described above is exemplified. In addition, to put this differently, by taking the highest security measure for (a) described above and lowering the degree of the security measure in the order of (b) and (c) described above, a drop in a processing speed or a rise in a processing load resulting from the security measures can be reduced, and therefore the implementation can be achieved more easily.

As described above, for example, to understand it from the perspective of security, it is possible to classify security levels into different states. In the information processing method according to the present embodiment, since a process is performed beginning from the timing of (a) above, processes related to the information processing method according to the present embodiment can be said to be more secure processes from the perspective of security.

Although the information processing system has been exemplified in the description so far, the present embodiment is not limited thereto. The present embodiment can be applied to any device that can perform communication such as contactless communication, contact communication, wired communication, or wireless communication except for contact communication with an external apparatus, for example, a tablet-type apparatus, a communication apparatus such as a mobile phone or a smartphone, a video/music reproduction apparatus (or a video/music recording and reproduction apparatus), a game device, or a computer such as a personal computer (PC).

In addition, although the information processing apparatus has been exemplified in the description as the present embodiment, the present embodiment is not limited thereto. The present embodiment can be applied to a processing IC that can be incorporated into the information processing system according to the present embodiment, for example, a UICC, a SIM, an eUICC, an eSE, an SD card, or the like. In addition, the present embodiment can be, for example, detachable from the information processing system according to the present embodiment. Furthermore, the present embodiment can also be applied to any device that can perform communication such as contactless communication, contact communication, or wired communication with an external apparatus, for example, a tablet-type apparatus, a communication apparatus such as a mobile phone or a smartphone, a video/music reproduction apparatus (or a video/music recording and reproduction apparatus), a game device, or a computer such as a personal computer (PC). That is, the information processing apparatus according to the present embodiment may be the information processing system according to the present embodiment.

The communication control apparatus has been exemplified in the description as the element included in the information processing system according to the present embodiment, but the present embodiment is not limited to this form. The present embodiment can be applied to, for example, any processing IC, such as a CLF, that can perform contactless communication with an external apparatus via a connected antenna or an included antenna.

The processing apparatus has been exemplified in the description as the element included in the information processing system according to the present embodiment, but the present embodiment is not limited to this form. The present embodiment can be applied to, for example, a processing IC which is configured to include an MPU or various processing circuits and can perform various processes.

In addition, although the external apparatus that outputs an RF magnetic field (carrier) has been exemplified in the description as the present embodiment, the present embodiment is not limited thereto. The present embodiment can be applied to "any device that can perform contactless communication with the information processing system according to the present embodiment, for example, a reader/writer, a device having a reader/writer function such as an automatic ticket checker of a transportation facility" or "any device that can perform contact communication, wired communication, and wireless communication except for contactless communication with the information processing system according to the present embodiment."

Program According to Embodiment

As a program for causing a computer to function as the information processing apparatus according to the present embodiment (for example, a program by which processes related to the information processing method according to the present embodiment such as "the process (1) (key information generation process) to the process (4) (execution process)," or "the process (1) (key information generation process) to the process (4) (execution process), and the process (5) (cancellation process)" are executed) is executed by a processor in the computer, a process can be performed using information acquired from a specific application.

Moreover, when a program that causes a computer to function as the information processing apparatus according to the present embodiment is executed by a processor or the like in the computer, it is possible to provide an effect provided by the processing related to the information processing method according to the present embodiment described above.

The program according to the present embodiment may be, for example, a program operating solely, or a library used from another program such as an application.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the information processing apparatus according to the present embodiment is provided, but the present embodiment can further provide a recording medium in which the above-described program is stored together.

The above-described configurations express examples of the present embodiment and, of course, pertain to the technical scope of the present disclosure.

In addition, the effects described in the present specification are merely illustrative and demonstrative, and not limitative. In other words, the technique according to the present disclosure can exhibit other effects that are evident to those skilled in the art along with or instead of the effects based on the present specification.

Additionally, the present technology may also be configured as below.

(1)

An information processing apparatus including:
a processing unit configured to selectively perform a process using information acquired from an application,
wherein the processing unit
generates second key information based on first key information when the first key information is acquired from an application,
retains specific information for specifying a target application on which a process is to be performed, when the first key information is acquired,
determines whether an accessing application is the target application based on the specific information when being accessed by the application after the specific information is retained,
performs a process based on information acquired from the accessing application and the second key information when the application is determined to be the target application, and
refrains from performing a process using information acquired from the accessing application when the application is determined not to be the target application.

(2)

The information processing apparatus according to (1),
wherein the processing unit
retains channel information indicating a channel corresponding to an application corresponding to the acquired first key information as the specific information, and
determines whether an accessing application is the target application by determining whether a channel corresponding to the accessing application is the channel indicated by the channel information.

(3)

The information processing apparatus according to (1),
wherein the processing unit acquires identification information indicating one or two or more applications corresponding to the acquired first key information and retains the acquired identification information as the specific information, and determines whether an accessing application is the target application by determining whether the accessing application is an application indicated by the identification information.

(4)

The information processing apparatus according to (3), further including:

a management unit configured to manage the identification information, wherein the processing unit acquires the identification information from the management unit.

(5)

The information processing apparatus according to any one of (1) to (4), further including:

a storage unit configured to store an application, wherein the processing unit selectively performs a process using information acquired from the application stored in the storage unit.

(6)

The information processing apparatus according to any one of (1) to (5), further including:

a communication control unit capable of performing contactless communication with an external apparatus using a carrier, wherein the processing unit and the target application jointly process information transmitted from the external apparatus.

(7)

The information processing apparatus according to (6), further including:

an antenna, wherein the communication control unit communicates with the external apparatus via the antenna, (8)

An information processing method executed by an information processing apparatus, including:

a step of selectively performing a process using information acquired from an application, wherein, in the step of performing the process, when first key information is acquired from an application, second key information is generated based on the first key information, when the first key information is acquired, specific information for specifying a target application on which a process is to be performed is retained, when there is access from an application after the specific information is retained, whether the accessing application is the target application is determined based on the specific information, when the application is determined to be the target application, a process is performed based on information acquired from the accessing application and the second key information, and when the application is determined not to be the target application, a process using information acquired from the accessing application is not performed.

(9)

A program causing a computer to execute a step of selectively performing a process using information acquired from an application, wherein, in the step of performing the process, when first key information is acquired from an application, second key information is generated based on the first key information, when the first key information is acquired, specific information for specifying a target application on which a process is to be performed is retained, when there is access from an application after the specific information is retained, whether the accessing application is the target application is determined based on the specific information, when the application is determined to be the target application, a process is performed based on information acquired from the accessing application and the second key information, and when the application is determined not to be the target application, a process using information acquired from the accessing application is not performed.

REFERENCE SIGNS LIST 100 information processing apparatus
102 communication unit
104 storage unit
106 control unit
110 processing unit
112 management unit
200 communication control apparatus
300 antenna
400 processing apparatus
500 external apparatus
1000, 2000 information processing system

The invention claimed is:

1. An information processing apparatus comprising:
a communication control unit configured to perform contactless communication with an external apparatus in order to initiate a change of key information; and
a processing unit configured to selectively perform a process on an accessing application using information acquired from a target application,
wherein the processing unit
generates second key information based on first key information when the first key information is acquired from the target application,
retains specific information for specifying the target application on which the process is to be performed, when the first key information is acquired,
determines whether the accessing application is the target application based on the specific information when being accessed by the accessing application after the specific information is retained,
performs the process based on information acquired from the accessing application and the second key information when the accessing application is determined to be the target application, and
refrains from performing the process using information acquired from the accessing application when the accessing application is determined not to be the target application,
wherein the specific information includes at least one of a context ID or a system code of the target application,
wherein the specific information further includes channel information,
wherein the processing unit
retains the channel information indicating a channel corresponding to the target application corresponding to the acquired first key information as the specific information, and determines whether the accessing application is the target application by determining whether a channel corresponding to the accessing application is the channel indicated by the channel information, and wherein the communication control unit and the processing unit are each implemented via at least one hardware processor.

2. The information processing apparatus according to claim 1, wherein the processing unit acquires the identification information indicating one or more applications corresponding to the acquired first key information and retains the acquired identification information as the specific information, and determines whether the accessing application is the target application by determining whether the accessing application is indicated by the identification information.

3. The information processing apparatus according to claim 2, further comprising:

a management unit configured to manage the identification information, wherein the processing unit acquires the identification information from the management unit, and wherein the management unit is implemented via at least one hardware processor.

4. The information processing apparatus according to claim 1, further comprising:

a non-transitory computer-readable storage medium configured to store the target application, wherein the processing unit selectively performs the process on the accessing application using information acquired from the target application stored in the non-transitory computer-readable storage medium.

5. The information processing apparatus according to claim 1, wherein the communication control unit performs the contactless communication with the external apparatus using a carrier, and wherein the processing unit and the target application jointly process information transmitted from the external apparatus.

6. The information processing apparatus according to claim 5, further comprising:

an antenna, wherein the communication control unit communicates with the external apparatus via the antenna.

7. An information processing method executed by an information processing apparatus, comprising:

performing contactless communication with an external apparatus in order to initiate a change of key information; and selectively performing a process on an accessing application using information acquired from a target application, wherein, in performing the process, when first key information is acquired from the target application, second key information is generated based on the first key information, when the first key information is acquired, specific information for specifying the target application on which the process is to be performed is retained, when there is access from the accessing application after the specific information is retained, whether the accessing application is the target application is determined based on the specific information, when the accessing application is determined to be the target application, the process is performed based on information acquired from the accessing application and the second key information, and when the accessing application is determined not to be the target application, the process using information acquired from the accessing application is not performed, wherein the specific information includes at least one of a context ID or a system code of the target application, wherein the specific information further includes channel information, and wherein the method further comprises retaining the channel information indicating a channel corresponding to the target application corresponding to the acquired first key information as the specific information, and determining whether the accessing application is the target application by determining whether a channel corresponding to the accessing application is the channel indicated by the channel information.

8. A non-transitory computer-readable medium having embodied thereon a program, which when executed by a computer causes the computer to execute a method, the method comprising:

performing contactless communication with an external apparatus in order to initiate a change of key information; and selectively performing a process on an accessing application using information acquired from a target application, wherein, in performing the process, when first key information is acquired from the target application, second key information is generated based on the first key information, when the first key information is acquired, specific information for specifying the target application on which the process is to be performed is retained, when there is access from the accessing application after the specific information is retained, whether the accessing application is the target application is determined based on the specific information, when the accessing application is determined to be the target application, the process is performed based on information acquired from the accessing application and the second key information, and when the accessing application is determined not to be the target application, the process using information acquired from the accessing application is not performed, wherein the specific information includes at least one of a context ID or a system code of the target application, wherein the specific information further includes channel information, and wherein the method further comprises retaining the channel information indicating a channel corresponding to the target application corresponding to the acquired first key information as the specific information, and determining whether the accessing application is the target application by determining whether a channel corresponding to the accessing application is the channel indicated by the channel information.

9. The information processing apparatus according to claim 1, wherein the processing unit and the target application jointly process a request to perform the change of key information transmitted from the external apparatus.

10. The information processing apparatus according to claim 1,
wherein the specific information includes the context ID and the system code of the target application.

* * * * *